United States Patent
Rane et al.

(10) Patent No.: US 11,951,432 B2
(45) Date of Patent: Apr. 9, 2024

(54) FILTER ELEMENT

(71) Applicant: Consair OY, Helsinki (FI)

(72) Inventors: Enna Rane, Helsinki (FI); Antti Väisänen, Espoo (FI); Frank Russi, Helsinki (FI)

(73) Assignee: CONSAIR OY, Helsinki (FI)

( * ) Notice: Subject to any disclaimer, the term of this patent is extended or adjusted under 35 U.S.C. 154(b) by 0 days.

(21) Appl. No.: 17/262,240

(22) PCT Filed: Jul. 8, 2019

(86) PCT No.: PCT/FI2019/000013
§ 371 (c)(1),
(2) Date: Jan. 22, 2021

(87) PCT Pub. No.: WO2020/021156
PCT Pub. Date: Jan. 30, 2020

(65) Prior Publication Data
US 2021/0245082 A1    Aug. 12, 2021

(30) Foreign Application Priority Data
Jul. 22, 2018    (FI) ..................................... 20187094

(51) Int. Cl.
*B01D 46/00*    (2022.01)
*B01D 46/10*    (2006.01)
(Continued)

(52) U.S. Cl.
CPC ..... *B01D 46/0041* (2013.01); *B01D 46/0005* (2013.01); *B01D 46/10* (2013.01);
(Continued)

(58) Field of Classification Search
None
See application file for complete search history.

(56) References Cited

U.S. PATENT DOCUMENTS 2,811,842 A    11/1957    Taylor
3,905,787 A *  9/1975    Roth ................. B01D 46/0089
                                              55/488
(Continued)

FOREIGN PATENT DOCUMENTS

CN    107322794 A    11/2017
GB    2474629 A    4/2011
(Continued)

OTHER PUBLICATIONS

English Language Translation of KR20080005727 (U).
(Continued)

*Primary Examiner* — Brit E. Anbacht
(74) *Attorney, Agent, or Firm* — BelayIP

(57) ABSTRACT

The present disclosure is related to filter elements and more specifically to filter elements for removing dust from air. In an embodiment, an inventive filter element includes a housing having a first side and a second side, filter material in the housing, a space between the filter material and the first side of the housing for forming a suction chamber, and at least one hole in the first side, whereby the area within the circumference of the side of the filter material facing the first side of the housing is larger than the area of at least one hole.

6 Claims, 3 Drawing Sheets

(51) Int. Cl.
  *B01F 35/00* (2022.01)
  *B01F 101/28* (2022.01)
  *B28C 7/00* (2006.01)

(52) U.S. Cl.
  CPC .......... *B01F 35/186* (2022.01); *B01F 35/187* (2022.01); *B28C 7/0007* (2013.01); *B01F 2101/28* (2022.01)

(56) References Cited

U.S. PATENT DOCUMENTS

| | | | | |
|---|---|---|---|---|
| 5,100,445 | A * | 3/1992 | Johnson | B01D 46/10 55/413 |
| 6,297,950 | B1 * | 10/2001 | Erwin | B01D 46/0005 361/679.49 |
| 6,440,190 | B1 * | 8/2002 | Goyetche | B01D 46/0023 55/385.1 |
| 7,993,434 | B2 * | 8/2011 | Oscar | F24F 13/085 95/273 |
| 2001/0022069 | A1 * | 9/2001 | Fath | B01D 46/10 55/497 |
| 2003/0141240 | A1 * | 7/2003 | Shiraishi | B01D 46/10 210/350 |
| 2005/0013711 | A1 * | 1/2005 | Goyetche | B01D 46/10 417/423.9 |
| 2006/0096261 | A1 * | 5/2006 | Zhang | B01D 46/0004 55/506 |
| 2006/0117726 | A1 | 6/2006 | Moreno | |
| 2009/0016151 | A1 * | 1/2009 | Beaton | B01F 15/00961 366/139 |
| 2011/0312261 | A1 * | 12/2011 | Cappuccio | B08B 15/02 454/63 |

FOREIGN PATENT DOCUMENTS

| | | |
|---|---|---|
| JP | H0231812 A | 2/1990 |
| KR | 20080005727 U | 11/2008 |
| WO | WO2016102744 A1 | 6/2016 |

OTHER PUBLICATIONS

English Langauge Translation of JPH0231812 (A).
Office Action dated Jul. 20, 2020 for Finnish Priority U.S. Appl. No. 20/187,094, Applicant Consair Oy.

* cited by examiner

FILTER ELEMENT

CROSS REFERENCE TO RELATED APPLICATIONS

This application is a national phase application of International Application No.: PCT/FI2019/000013, filed on Jul. 8, 2019, and claims the priority benefit of Finnish patent application 20187094, filed on Jul. 22, 2018, the content of both of which is incorporated herein by reference.

BACKGROUND OF THE INVENTION

1. Field of the Invention

The invention is related to filter elements, more specifically to filter elements for removing dust from air.

2. Description of Related Art

Handling and changing of filters which remove dust from air is typically a quite dusty task.

U.S. Pat. No. 7,993,437 describes the problem of spreading of dust when changing a a filter. The solution described in the patent was to use a plastic bag to stop spreading of dust during changing of the filter. Several similar structures involving use of plastic bags have been patented.

U.S. Pat. No. 6,149,699 teaches changing a filter along with the housing of the filter, and by using a vacuum to maintain low pressure within the filter element during the change.

Dust removal is an ever present problem at construction sites. Many different phases of work produce harmful dust, depending on the particular phase of work and material being handled. For example, table saws produce wood dust, and drilling or chiseling produces harmful stone dust. Mixing mortars, concrete, and plaster produces large amounts of harmful fine dust.

Air scrubbers, are typically used at construction sites for cleaning air, recirculating air, and for sucking dusty air out of the working space. These reduce the amount of dust floating in the air in the working space, and a slight vacuum prevents dust from escaping outside the working space under slight vacuum other than out through the air scrubber. However, air scrubbers do not remove dust very efficiently from a particular work location. A problem with typical air scrubbers is that the airflow speed is not optimal to remove dust from air when a cloud of dust is created. Further, the coarse filter in a typical air scrubber may quickly get saturated from clouds of dust, which causes the airflow to decrease.

A further problem of a typical air scrubber is that dust collected by the scrubber is too easily released back into the environment. This is due to the typical structure of an air scrubber, where the filter element is exposed on a face of the device. When the device is switched off and there is no airflow, the slightest vibration or nudge of the device easily dislocates some dust, causing it to fall down on the floor or become floating in the air. Also, changing of the filter element tends to be messy, as a lot of the dust on the filter element gets spread around during changing.

A solution is known from the patent application US20110312261A1, in which a strong blower has been connected to a tent-like structure for removal of dust from a work location. This solution has the advantage, that the worker fits in the tent-like structure with his dust producing tool, whereby with sufficient suction this kind of solution is likely to prevent escaping of dust outside the tent-like structure. However, this kind of structure does not protect the worker himself in any way. Moving of the structure is also rather troublesome, since the structure consists of several separate and large components.

Other types of targeted spot dust removal solutions are known. Patent application US2009016151A1 describes a solution for removing dust created during mixing of mortar or similar materials, in which dust removal is implemented using a suction ring placed at the top of the mixing container. This kind of solution is apparently rather efficient in removing dust arising from the mixing container. However, this kind of solution does not help at the preceding moment, when mortar powder is poured from the sack of mortar into the mixing container. This is a work phase that produces a lot of dust. When the dust is created above the suction ring in open air space, the effectiveness of dust removal is unavoidably poor. In addition, a suction ring of fixed size does not apply very well to use with containers of different sizes.

Further, the patent application PCT/FI2015/000043 describes a device which removes dust from the air, and is particularly useful for removing dust from a work location where large amounts of dust is produced, such as from mixing of water and dry mortar. However, changing of the filter even in this solutions is rather messy.

SUMMARY OF THE INVENTION

An object of the invention is to provide a filter element that allows for easy changing of the filtering element, while avoiding spreading of dust during changing of the filter. A further object of the invention is to provide a filter element that inhibits spreading of dust collected in the filter element when the filtering device comprising the filter element is switched off, and during moving of such a filtering device.

These objects are reached by arranging the filter material in a housing, and arranging for a space between the filter material and a first side of the housing in order to form a suction chamber, and arranging for at least one hole in said first side, whereby the area within the circumference side of the filter material facing said first side of said housing is larger than the area of said at least one hole. The suction chamber allows some of the dust to settle to the bottom of the suction chamber, thereby reducing clogging of the filter material. Further, the suction chamber reduces spreading of dust already collected back to the environment, since any vibrations or jolts that may loosen dust from the filter element cause the loosened dust to fall to the bottom of the suction chamber, still remaining within the filter element. Further, dust particles carried by turbulent air within the suction chamber often also hit the walls of the suction chamber or the surface of the filter and fall to the bottom of the suction chamber. Also, any dust released to air within the suction chamber by turbulence in the airflow tends to stay within the suction chamber. Further, the difference in the surface areas of the filter material and the hole or holes of the first side of the housing allow the airflow into the filter element to be fast enough to carry dust into the filter element, while keeping the airflow per unit of area of the filter material low enough to have the dust remain within the filter material and to avoid passing of dust through the filter material.

The above summary relates to only one of the many embodiments of the invention disclosed herein and is not intended to limit the scope of the invention, which is set forth in the claims herein. These and other features of the present invention will be described in more detail in the following in this specification.

BRIEF DESCRIPTION OF THE DRAWINGS

Various embodiments of the invention will be described in detail below, by way of example only, with reference to the accompanying drawings, of which

Same reference numerals are used for similar entities in the figures.

DETAILED DESCRIPTION OF EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a filter with which various embodiments of the invention may be implemented. Only elements relevant for illustrating the embodiments are described in detail.

Details that are generally known to a person skilled in the art may not be specifically described herein.

Figure 1:
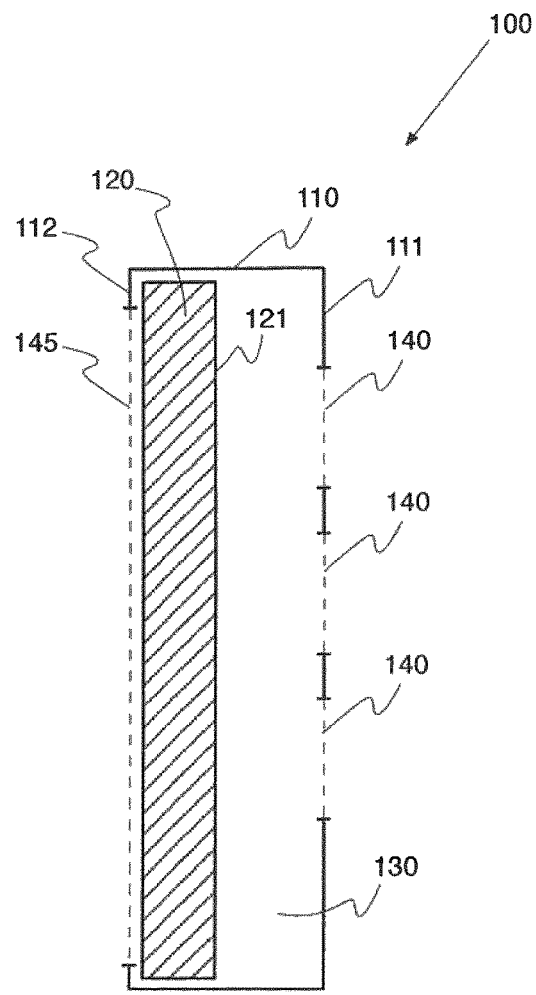
FIG. 1 illustrates the structure of a filter element according to an embodiment of the invention.

In the following we describe certain examples of embodiments of the invention. FIG. 1 illustrates a cross section of a filter element 100 for filtering dust from air according to an embodiment of the invention. FIG. 1 shows the housing 110 of a filter element. The housing has a first side 111 and a second side 112, the first side being the inlet side and the second side being the exhaust side. The housing 110 contains filter material 120. The filter material 120 is located in the housing 110 in such a way, that a free space 130, a suction chamber 130, is formed allowing free movement of air within the free space 130. The first side 111 of the housing has one or more holes 140. The second side 112 of the housing has at least one exhaust hole 145. The example of FIG. 1 shows three holes 140, but that does not limit the invention in any way. In various embodiments of the invention there may for example be only one hole, or more than three holes. The total area of the hole or holes 140 is smaller than the area within the circumference of the side 121 of the filter material facing the first side 111 of the housing 110.

The free space 130, i.e. the suction chamber 130, brings several benefits. The chamber promotes maintaining of already collected dust within the filter element without the already collected dust being able to accidentally become floating in the air outside the filter element due to vibration or movement. This is due to the filter material being inside the chamber of the filter element, whereby dust possibly falling off the filter falls to the bottom of the chamber 130 and not somewhere outside the filter element, when the filtering equipment where the filter element is installed is switched off and/or disturbed in other ways. Further, any dust becoming airborne from the surface of the filter material due to turbulence close to the surface of the filter material remains within the chamber, since the only flow of air out of the chamber is through the filter material.

The feature that the total area of the hole or holes 140 is smaller than the circumference of the side 121 of the filter material facing the first side 111 of the housing 110 also brings several benefits. Firstly, that feature causes the inlet airflow speed to be higher than airflow speed through the filter material. A higher airflow speed better transports any dust in the air into the filter element than a lower airflow speed. Further, filter materials generally pass the more dust particles the higher the airflow speed is through the filter material. However, at a lower airflow speed the dust is collected throughout the filtering material, which allows more dust to be collected before the filter material becomes too clogged. Consequently, an optimal filtering solution is reached by having the total area of the hole or holes be smaller than the surface area of the filter material, since then the incoming airflow speed at the inlet is high enough to carry dust particles, but the airflow through the filter material is not too high.

Also, low airflow speed and/or turbulence within the chamber allows some of the dust to settle to the bottom of the chamber. This reduces the dust collection load of the filter material, thereby reducing clogging of the filter material and lengthening the time until the filter element needs to be changed. In experiments performed by the inventors, amount of dust settled to the bottom of the chamber has often exceeded the amount of dust retained within the filter material, even by five times. This effect allows lengthening of filter changing periods of the inventive filter structure compared to prior art filters. The slow airflow speed within the suction chamber also has the effect that a lot of the dust which the filter material collects remains at the front side of the filter material, where the dust can easily drop off and fall to the bottom of the suction chamber, especially during times when the filtering device is switched off i.e. no airflow through the filter element exists. The slow airflow speed also makes it possible for the dust to get stuck on the inside walls of the suction chamber, from where the dust also easily falls off to the bottom of the suction chamber. A further beneficial effect of the suction chamber is that the turbulence of incoming air within the suction chamber distributes the dust more evenly over the surface of the filter material. The suction inlet and suction chamber effectively act as brakes for the incoming dust, slowing its speed along with the airflow, by creating turbulence in the airflow, which at least partially blocks the direct travel of the dust into the filter material, spreading it around the suction chamber and the front surface of the filter material.

The depth of the suction chamber i.e. the distance between the front side of the filter material and the first side of the housing needs to be large enough to allow turbulence of air to spread incoming dust within the suction chamber. The inventors have found that the depth should be more than 1 cm, preferably 2 cm or more. In experiments with a filter element having the dimensions of 40 cm by 60 cm, the inventors observed good dust collection results when the depth of the suction chamber was roughly 4 to 6 cm, i.e. roughly 10% of the lateral dimensions of the filter element. However, the invention is not limited to these ranges, as the exact measurements are application dependent. The depth can be larger or smaller than 10%. In an embodiment of the invention, the depth of the suction chamber is roughly between 10% and 20% of the lateral measurements of the filter element. In further embodiments of the invention the depth of the suction chamber can be roughly 5% or less of the lateral dimensions of the filter element. In still further embodiments of the invention the depth of the suction chamber can be roughly 2% or less of the lateral dimensions of the filter element.

One common method to increase surface area of filter material in a filter element is to fold the filtering element in a zigzag pattern. This kind of arrangement of filter material can also be used in an embodiment of the invention. In such an embodiment, the depth of the suction chamber is measured from the folds of the filter material closest to the first side of the housing of the filter element.

In an embodiment of the invention the filter material comprises more than one layer of different types of filter material. The kinds of filter materials, number of layers, and the thicknesses of the layers are all application dependent, and are therefore not explained in more detail in this specification. A man skilled in the art can construct different combinations of filter material types for different applications.

Some filter materials are soft enough so that the filter material is compressed merely by the airflow, when air is sucked through the filter material. In an embodiment of the invention, this effect is used to create a suction chamber during use of the filtering device where the inventive filter element is placed. Filter elements manufactured according to such an embodiment may not have sufficient free space to form a functional suction chamber when not subjected to airflow, and have a well functioning suction chamber only during use.

The difference between the first area within the circumference of the filter material and the combined second area of the hole or holes in the first side of the housing can be different in different embodiments of the invention. In one embodiment of the invention, the second area is smaller than the first area. In a further embodiment of the invention, the second area is 80% or less of the first area. In a still further embodiment of the invention, the second area is 60% or less of the first area. In a still further embodiment of the invention, the second area is 40% or less of the first area. In a still further embodiment of the invention, the second area is 20% or less of the first area. The exact ratio of these two areas is application dependent, and can be optimized to different values depending on for example the type and amount of dust to be collected, filter materials, and size of the filter element.

Figure 2:
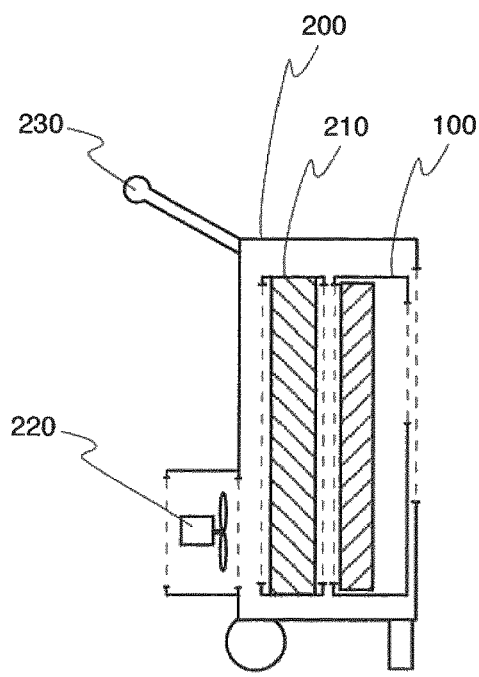
FIG. 2 illustrates a scenario for usage of a filter element according to an embodiment of the invention.

FIG. 2 illustrates one scenario for usage of a filter element 100 according to an embodiment of the invention shown in FIG. 1. FIG. 2 shows a diagram of a portable air filtering device 200. The air filtering device comprises a filter element 100. FIG. 2 also shows a second stage filtering element 210 to further increase the quality of filtering. The filtering device comprises a a motor and impeller unit 220 for sucking air inside the device and through the filters 100, 210. In the example of FIG. 2, the device 200 includes wheels and a handle 230 for easy transportation at a work site. This kind of device is very useful for targeted dust removal from a single location, for example for removal of dust from mixing of mortar. When the device is placed immediately beside the bucket where the mortar is mixed, any dust released by pouring of dry mortar into the bucket will get sucked into the device before the dust has any chance of spreading elsewhere in the work site.

Figure 3:
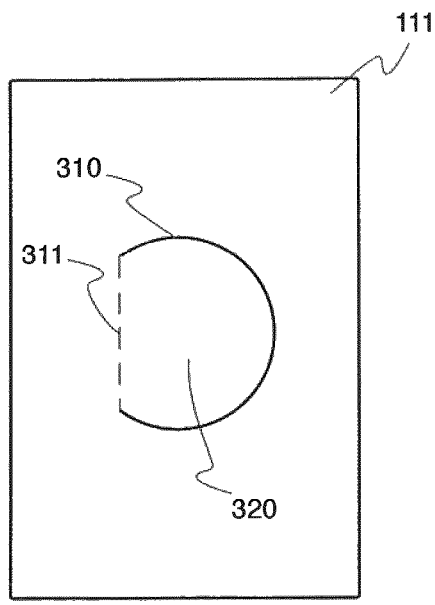
FIG. 3 illustrates the structure of a hole and a flap in the housing of the filter element according to an embodiment of the invention.

FIG. 3 illustrates the structure of a hole and a flap in the housing of the filter element according to an embodiment of the invention. FIG. 3 shows the first side 111 of the filter element, comprising a cutout 310 and a flap 320 created by the cutout. When the flap is bent, a hole delimited by the cutout 310 is opened. The dashed line 311 in FIG. 3 indicates the bending line along which the flap 320 can be bent. In various embodiments of the invention the flap may be bent in either direction—either towards the filter material or away from it.

The example of FIG. 3 shows one hole and flap in the first side 111 of the housing of the filter element. However, this is only one example of an embodiment of the invention, and the first side 111 of the housing of the filter element can have multiple holes and flaps in different embodiments of the invention.

In certain further embodiments of the invention, not all holes need to have a flap. In a further embodiment of the invention in which the first side 111 has a plurality of holes, only a part of the holes have a flap 320.

In a further embodiment of the invention, the flap 320 forms a splash guard in order to prevent or at least reduce the chances of a splash of mortar being mixed in front of the filter element entering the filter element and hitting the filter material.

In a further embodiment of the invention, the flap 320 is removable from the filter element.

The flap 320 further protects the filter material before the filter element is taken into use. In a further embodiment of the invention, also an exhaust hole is covered by a flap.

Figure 4:
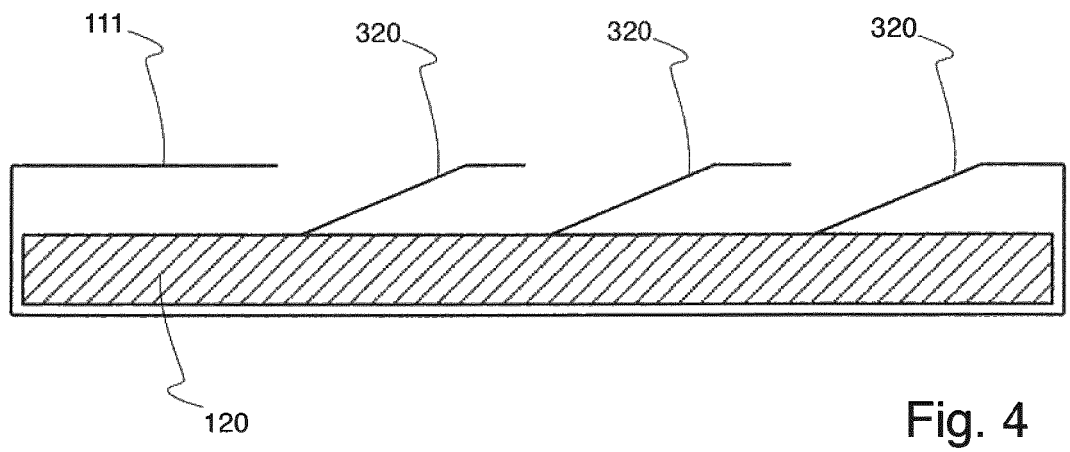
FIG. 4 illustrates a further embodiment of the invention, in which the flap can be used to support the first side of the filter element.

FIG. 4 illustrates a further embodiment of the invention, in which the flap 320 can be used to support the first side 111 of the filter element. In an actual implementation of the filter element according to an embodiment of the invention, the material of the housing of the element may be a thin and cheap material such as cardboard or thin plastic, the material may be quite flexible. In such a case the first side 111 gets easily bent towards the filter material 120, thereby reducing the volume of space between the filter material and the first side 111. This in turn reduces the ability of the filter element to retain dust inside the filter element, since if the first side touches the filter material at some location, any loosened dust may escape through a hole in the first side back to outside of the filter element. To prevent this from happening, the flap or flaps 320 may be bent inwards towards the filter material 120, even so far as to touch the filter material 120, whereby the flap or flaps 320 form a mechanical support to keep the first side 111 of the housing away from the filter material. Further, some filter materials may also be quite flexible, especially after collecting a lot of dust. Support from flap or flaps 320 is beneficial also with such materials.

FIG. 4 also illustrates such an embodiment of the invention in which the first side 111 of the housing of the filter element comprises more than one hole.

Figure 5:
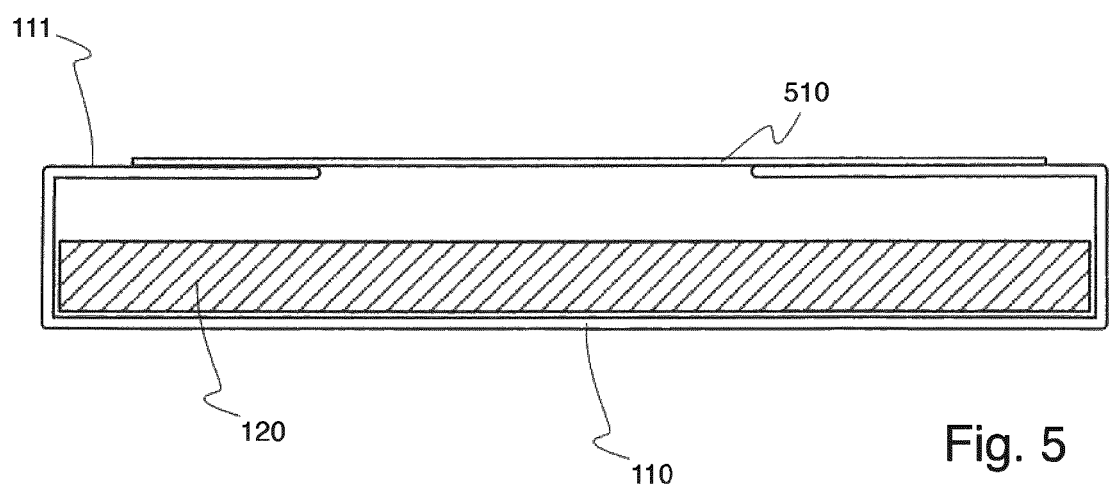
FIG. 5 illustrates an embodiment, in which the filter element comprises a detachable cover for covering at least one hole in the first side of the housing.

FIG. 5 illustrates diagrammatically an embodiment, in which the filter element comprises a detachable cover 510 for covering at least one hole in the first side 111 of the housing 110. FIG. 5 also shows filter material 120 in the housing 110 of the filter element. The detachable cover 510 can be attached to the filter element for example using glue, velcro tape, or other similar ways known to a man skilled in the art. Further, the detachable cover can be attached to the filter element via a perforated line or other tearable connection.

In a further embodiment of the invention, after detaching the cover can be reattached to the filter element to cover said at least one hole. Such an embodiment has the advantage that having a convenient way of closing the holes in the first side of the filter element would keep the dust inside the filter element after the filter element is removed from the filtering device.

Figure 6A:
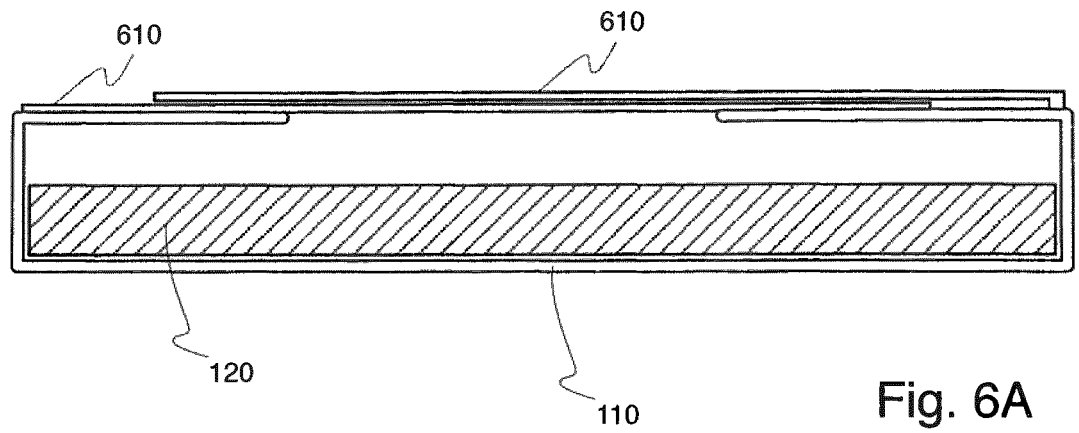
FIGS. 6A and 6B illustrate an embodiment of the invention in which the filter element further comprises two doors.
Figure 6B:
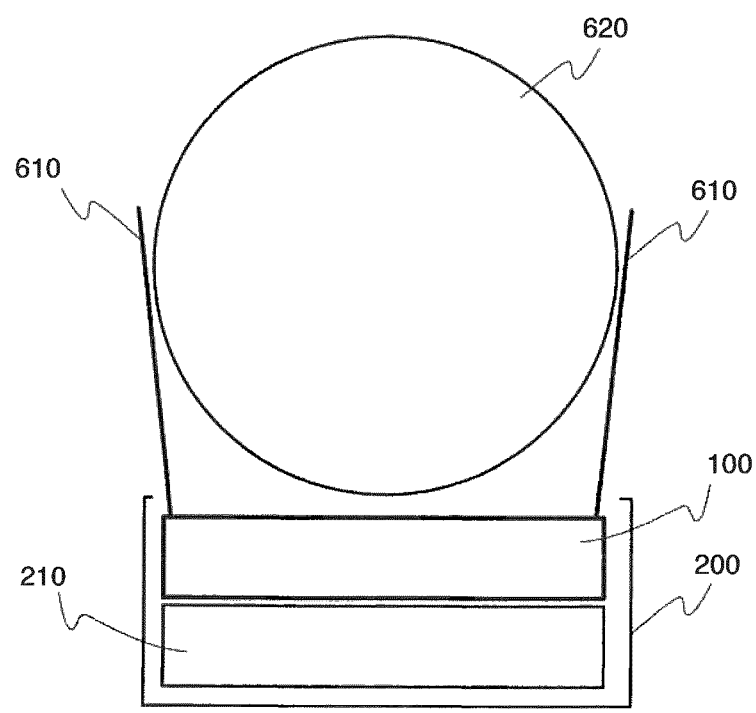

FIGS. 6A and 6B illustrate an embodiment of the invention in which the filter element further comprises two doors 610 foldable to cover one or more holes in the first side 111 of the housing 110 and openable to provide a guide for airflow towards said one or more holes. FIG. 6A also shows the filter material 120. FIG. 6A illustrates the doors 610 folded over the holes in the first side of the housing, thereby inhibiting release of any dust from within the filter element to the environment e.g. after removal of the filter element or during transport of a filter device containing the filter element.

FIG. 6B illustrates a schematical cut out diagram of the filter element 100 installed in a filtering device 200. The filtering device 200 also comprises a second stage filtering element 210. FIG. 6B shows the doors placed beside a bucket 620 for mixing mortar. This placement of the doors guides the airflow generated by the filtering device 200 so that dust containing air from above the bucket 620 is transferred into and through the filter 100, while allowing little of the dust containing air to escape into the surroundings. A benefit of such an embodiment is better containment of dust that is created in front of the filter element, since the doors guide the airflow towards the hole or holes in the first side of the filter element. FIG. 6B is an example of a possible use case for the inventive filter element, and the invention is not limited to such uses or for example only for removal of mortar dust. The inventive filter element may be used for removal of many other types of dust as well.

A further benefit is that the doors can be closed over the hole or holes in the first side of the filter element to hinder the spreading of dust from inside of the filter element to the environment, which is beneficial when the filtering device containing the filter element is moved around and also when the filtering element is removed.

A still further element is that the doors also act as a splash guard. Mixing of mortar is a dirty job, and splashes are easily created. The doors help to catch at least some of the splashes, which protects the filtering device where the filtering element is contained, as well as the immediate surroundings from splashes.

The inventive filtering element is not limited to removal of dust such as mortar dust or dust created by sawing, grinding, and other dust producing activities. The inventive filtering element can also be used for removal of aerosols and floating particles of liquids.

The invention has several benefits. The inventive filtering element makes changing of the filter an easy and clean operation, since the structure of the filter element keeps the collected dust inside the filter element. Further, the structure of the filter element keeps the collected dust inside the filter element during use of the filter, also during times when the filtering device containing the filter element is switched off.

The inventive filter element allows collection of much more dust than what is retained by the filter material only. This has the resulting benefit that the periods between filter element changes are longer than with prior art filter elements.

Embodiments of the invention where the filter element comprises doors provide a splash guard protecting the filtering device and its immediate surrounding from splashes of wet mortar, thereby reducing the effort and need to clean the device and/or the surroundings.

The inventive filtering element is cheap to produce, even while providing these benefits.

In the following we discuss certain further embodiments of the invention.

An aspect of the invention provides a filter element for filtering dust from air. According to a first embodiment of this aspect of the invention the filter element comprises at least a housing having a first side and a second side, filter material in said housing, a space between said filter material and said first side of said housing for forming a suction chamber, and at least one hole in said first side, whereby the area within the circumference of the filter material facing said first side of said housing is larger than the area of said at least one hole.

According to a second embodiment of this aspect of the invention a hole in said first side is delimited by a cutout forming a flap covering said hole.

According to a third embodiment of this aspect of the invention said flap is bendable to open said hole and to form a splash guard.

According to a fourth embodiment of this aspect of the invention said flap is bendable towards the filter material for forming a mechanical support for keeping said first side of the housing away from the filter material.

According to a fifth embodiment of this aspect of the invention the filter element further comprises at least a detachable cover for a hole in said first side of the housing.

According to a sixth embodiment of this aspect of the invention the filter element further comprises at least two doors foldable to cover said one or more holes in the first side of the housing and openable to provide a guide for airflow towards said one or more holes.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A replaceable filter element for a filtering device for filtering dust from air flow, the replaceable filter element comprising:
   a housing having a first side and a second side, the first side configured to take in the air flow in a first direction and the second side configured to exhaust the air flow;
   filter material arranged within said housing between the first side and the second side;
   a suction chamber arranged between the first side and the filter material, configured to slow the air flow and to generate turbulence therein, and
   comprising a bottom connecting the first side and the second side, the bottom oriented approximately perpendicular to the first side and the second side and configured to receive dust descending in a second direction that is different from the first direction;
   at least one hole in said first side; and
   wherein the area within the circumference of the filter material facing said first side of said housing is larger than the area of said at least one hole;
      wherein said at least one hole in said first side is delimited by a cutout forming a flap covering said at least one hole; and
      wherein slow air flow facilitates accumulation of dust on an incident surface of the filter material and the air turbulence facilitates spreading of dust within the suction chamber.

2. The filter element according to claim 1, wherein said flap is bendable to open said at least one hole and to form a splash guard.

3. The filter element according to claim 1, wherein said flap is bendable towards the filter material for forming a mechanical support for keeping said first side of the housing away from the filter material.

4. The filter element according to claim 1, wherein said filter element comprises a detachable cover for said at least one hole in said first side of the housing.

5. The filter element according to claim 1, further comprising at least two doors foldable to cover said at least one hole in the first side of the housing and openable to provide a guide for airflow towards said at least one hole.

6. The filter element according to claim 1, wherein the bottom forms a side wall of the housing.

* * * * *